US 7,730,201 B1

(12) United States Patent
McAllister et al.

(10) Patent No.: US 7,730,201 B1
(45) Date of Patent: Jun. 1, 2010

(54) METHOD AND APPARATUS FOR CONGESTION AVOIDANCE IN SOURCE ROUTED SIGNALING PROTOCOL COMMUNICATION NETWORKS

(75) Inventors: Shawn P. McAllister, Manotick (CA); Paul Merlo, Ottawa (CA); Andrew Dolganow, Ottawa (CA)

(73) Assignee: Alcatel-Lucent Canada, Inc., Kanata, Ottawa (CA)

( * ) Notice: Subject to any disclaimer, the term of this patent is extended or adjusted under 35 U.S.C. 154(b) by 0 days.

(21) Appl. No.: 09/549,328

(22) Filed: Apr. 13, 2000

(51) Int. Cl.
*G06F 15/16* (2006.01)
*G06F 15/173* (2006.01)

(52) U.S. Cl. .................. 709/233; 709/235; 709/239

(58) Field of Classification Search ............... 709/239, 709/238, 235, 242, 232, 233; 370/237, 235, 370/238, 229
See application file for complete search history.

(56) References Cited

U.S. PATENT DOCUMENTS

| | | | | |
|---|---|---|---|---|
| 5,253,248 A * | 10/1993 | Dravida et al. | ............... | 370/228 |
| 5,768,258 A * | 6/1998 | Van As et al. | ............... | 370/236 |
| 6,038,218 A | 3/2000 | Otsuka et al. | | |
| 6,201,810 B1 * | 3/2001 | Masuda et al. | ......... | 370/395.32 |
| 6,212,164 B1 * | 4/2001 | Murakami et al. | .......... | 370/230 |
| 6,260,072 B1 * | 7/2001 | Rodriguez-Moral | ........ | 709/241 |
| 6,356,629 B1 * | 3/2002 | Fourie et al. | ............. | 379/112.1 |
| 6,424,620 B1 * | 7/2002 | Nishihara | .................... | 370/229 |
| 6,438,101 B1 * | 8/2002 | Kalampoukas et al. | ...... | 370/229 |
| 6,477,143 B1 * | 11/2002 | Ginossar | ..................... | 370/230 |
| 6,560,654 B1 * | 5/2003 | Fedyk et al. | ................ | 709/239 |
| 6,567,856 B1 * | 5/2003 | Steele et al. | ................ | 709/238 |
| 6,631,116 B1 * | 10/2003 | Eneroth et al. | ........... | 370/236.2 |
| 6,631,420 B1 * | 10/2003 | Li et al. | ....................... | 709/242 |
| 6,718,393 B1 * | 4/2004 | Aditya | ........................ | 709/239 |
| 6,732,185 B1 * | 5/2004 | Reistad | ....................... | 709/238 |
| 6,874,032 B2 * | 3/2005 | Gersht et al. | ................ | 709/235 |
| 7,158,486 B2 * | 1/2007 | Rhodes | ........................ | 370/256 |
| 7,185,112 B1 * | 2/2007 | Kuranari et al. | ............. | 709/249 |

OTHER PUBLICATIONS

International Telecommunication Union; Signalling Connection Control Part Procedures (serial); Jul. 1996; pp. i-17, 49-61, and 75; XP-002269325; Q.714.
International Telecommunication Union; Signalling Network Functions and Messages (serial); Jul. 1996; pp. i-10, 49-69; XP-002269326; Q.704.

(Continued)

*Primary Examiner*—Douglas B Blair
(74) *Attorney, Agent, or Firm*—Ross D. Snyder & Associates, Inc.

(57) ABSTRACT

A method and apparatus for communicating and utilizing control plane congestion information in a communication network that utilizes a source routed signaling protocol is presented. When control plane congestion is detected at a network element within the communication network, a congestion notification message is generated corresponding to the detected control plane congestion. The congestion notification is then provided to at least one additional network element within the communications network. The at least one additional network element can then utilize this knowledge of the congestion within the network to perform various network functions, including the routing a connection set-up message.

62 Claims, 3 Drawing Sheets

OTHER PUBLICATIONS

"Router—Wikipedia, the free encyclopedia," Oct. 24, 2009, pp. 1-6, http://en.wikipedia.org/wiki/Router.
"Routing control plane—Wikipedia, the free encyclopedia," Oct. 24, 2009, pp. 1-4, http://en.wikipedia.org/wiki/Routing_control_plane.
"Control plane—Telecom Definition," 2008, pp. 1-2, http://www.yourdictionary.com/telecom/control-plane.
"[RADIR] Definition of routing plane," Sep. 4, 2007, pp. 1-2, http://www.ietf.org/mail-archive/web/radir/current/msg00317.html.
"Chapter 7: Signaling Plane :: GPRS for mobile internet :: Mobile devices :: eTutorials.org," 2008-2009, p. 1, http://etutorials.org/Mobile+devices/gprs+mobile+internet/Chapter+7+Signaling+Plane.

* cited by examiner

METHOD AND APPARATUS FOR CONGESTION AVOIDANCE IN SOURCE ROUTED SIGNALING PROTOCOL COMMUNICATION NETWORKS

FIELD OF THE INVENTION

The invention relates generally to communication systems and more particularly to a method and apparatus for congestion avoidance in source routed signaling protocol communication networks.

BACKGROUND OF THE INVENTION

Communication between a calling party (source) and a called party (destination) may be established over a communications network. Such a communications network may use source routing protocols in order to establish connections over which such communication can occur. Communication networks that support source routing protocols typically include a number of individual switches through which calls are routed. A call set-up message is sent along a path between the source and the destination through a number of intervening switches in order to establish the call.

Signaling protocols can encounter congestion in the control plane used to carry such set-up messages. The control plane congestion can be the result of a number of different factors, including an overabundance of signaling traffic such as call set-up messages and/or control plane datagram messages, device speed mismatches within the communication network, or over-utilization of particular nodes or switches within the network.

In prior art systems, when a set-up message encounters a congested element or link within the network, no notification of such congestion is returned to the source node that issued the connection set-up message. As such, the source node may try the same path or a similar path for subsequent connection set-up. Such subsequent connection set-up messages may then encounter the same congestion encountered by the initial connection set-up message and may in fact compound the congestion. Repeated attempts to route connection set-up messages through congested portions of the network often result in unacceptable call set-up delays or in calls not being established at all.

Therefore, a need exists for a method and apparatus that allows for avoidance of congestion in source routed signaling protocol networks.

DETAILED DESCRIPTION

Generally, the present invention provides a method and apparatus for communicating and utilizing control plane congestion information in a communication network that utilizes a source routing signaling protocol. When control plane congestion is detected at a network element within the communication network, a congestion notification message is generated corresponding to the detected control plane congestion. The congestion notification is provided to at least one additional network element within the communications network. In some embodiments, the congestion notification is provided via the signaling plane, whereas in other embodiments, the routing plane may be utilized. The at least one additional network element can then utilize this knowledge of the congestion within the network to perform various network functions, including the routing of a new connection set-up message. By understanding congestion information as it relates to the network topology, source nodes generating connection set-up messages can route the connection set-up messages in an intelligent manner that avoids congested portions of the network.

Figure 1:
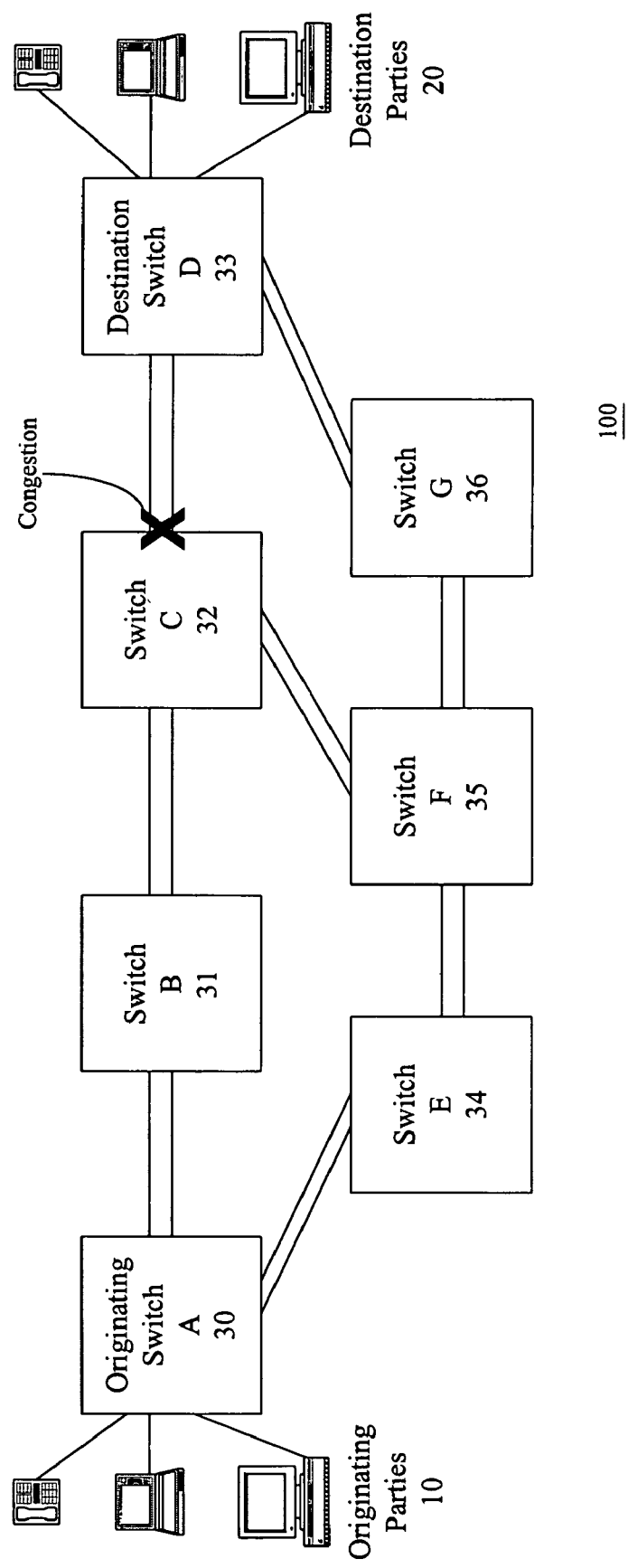
FIG. 1 illustrates a block diagram of a data communications network in accordance with an embodiment of the present invention.

The invention can be better understood with reference to FIGS. 1-5. FIG. 1 illustrates a communications network 100, which may be a packet- or cell-based communication network. The communication network 100 may be an asynchronous transfer mode (ATM) network that uses ATM cells to carry data traffic through the network. The network 100 allows the originating parties 10 to communicate with the destination parties 20 by establishing a connection through the various switches 30-36 included in the network 100. Each of the originating and destination parties 10 and 20 may be a router, a network coupled to a router, and or an end user device such as a personal computer, facsimile machine, video telephone, or any device that receives and or transmits data via a communication network. When an originating party 10 requests that a connection be established with a destination party 20, the originating switch A 30 attempts to establish a connection with the destination switch D 33 such that packets or cells may traverse the network along the connection and be delivered to the destination party 20.

Source routing protocols allow each node within the network to determine a complete path to a particular destination based on that node's knowledge of the network topology. Typically, each of the various switches, or nodes, within the network stores a routing table or other database that includes parameters concerning the various links (i.e. topology) of the network that may be used in routing calls. When a path to a particular destination is to be determined, the table is consulted to determine a path to the destination. The selection of the path may include determining the most efficient path, where various criteria such as cost, bandwidth availability, and the like are taken into account.

For example, if the originating switch A 30 wishes to establish a connection with the destination switch D 33, a likely path may route the connection through the switch B 31 and the switch C 32. In such an example, the originating switch A 30 issues a connection set-up message that traverses the network along the determined path and establishes the connection. The connection set-up message may traverse the network along the control plane within the network, where the control plane is separate from the data plane that carries data packets for various connections within the network.

Continuing with the example, if control plane congestion exists proximal to the switch C 32 such that the connection set-up message issued by the originating switch A 30 is significantly delayed, prior art systems would typically cause the connection attempt to time-out or be rejected by C 32. Such congestion proximal to the switch C 32 may be internal to the switch C 32 or may be along the link between the switch C 32 and the switch D 33. A time-out condition or detection of congestion causes a release message to be sent to the originating switch A 30 indicating that the connection set-up request failed. In other prior art systems, the switch C 32 may be capable of detecting control-plane congestion, however, the switch C 32 merely sends back a release message or an indication that control traffic to the congested switch should be reduced to the source in response to a connection set-up message in such prior art systems. In either prior art case, no additional information is provided to the originating switch A 30 to indicate that additional connection set-up attempts should be routed around the control-plane congestion existing at the switch C 32. As such, repeated connection set-up attempts may include the switch C 32 in the routing path for the connection set-up message, thus failing to alleviate any congestion and potentially compounding the congested condition.

The present invention provides a means for communicating the congested condition existing proximal to the switch C 32 to other switches within the network 100, including the originating switch A 30. As such, the originating switch A 30 receives notification of the congested condition at the switch C 32, and can route future connection set-up messages (both for the connection that has already been attempted and for future connections that must be established) along alternate paths such that unacceptable delays in connection set-up do not result. Note that the congestion indication generated and distributed within the network may be generated as a result of a received connection set-up request, or may be broadcast when the congested condition is first detected proximal to the switch C 32. In the case where the congestion indication is distributed in response to a connection set-up message, the originating switch A 30 preferably receives notification of the congestion, thus allowing the switch A 30 to determine an alternate routing path through the switches E, F, and G 34-36 to the destination switch D33 for the original and any subsequent calls which would otherwise traverse the congested point. Such a path is clearly more optimal in terms of minimizing call setup latency, than a path from switch A 30 through the switches E 34, F 35, and C 32 to the destination switch D 33, as the latter path would still encounter the congestion proximal to switch C 32.

In some embodiments, the congestion notification may be provided via the signaling plane that exists within the network. In the case where the congestion notification is propagated via the signaling plane, the congestion notification may be provided in response to a received connection set-up message generated by a source node in the network such as the switch A 30. In such a case, the source node will receive the congestion notification such that the source node will not make repeated attempts to route new connections through the congested network element. The congestion notification provided via the signaling plane may also be provided to each network element along the path traversed by the connection set-up message (from the source node to the congested node), such that each of the network elements along the connection set-up path is also notified of the congested element. These additional nodes may then utilize such knowledge to perform their own network function decisions.

When the network uses a signaling protocol that is supported by source routing, the signaling plane congestion notification may be included in a release message that includes a crankback information element. A crankback information element may be produced when a connection set-up message is held up due to congestion, where the crankback information element would include a special cause code indicating the congestion. The release message with crankback information element is relayed back to the source node that issued the connection set-up message such that the source node will attempt to find an alternate path to the destination. Such crankback messages (i.e. release messages with a crankback information element) may be used in an ATM network that utilizes a Private Network-Network Interface (PNNI) routing and signaling protocol. Specifics regarding the PNNI routing and signaling protocol may be found in the "Private Network-Network Interface Specification Version 1.0" as published by the ATM Forum in March of 1996.

Prior art systems utilizing the PNNI signaling protocol are limited to using crankback for reachability issues, resource errors, and designated transit list processing errors. Signaling congestion is not covered in these categories supported and therefore was not supported in prior art PNNI systems. By allowing the PNNI crankback message to be modified to include a congestion indication as discussed herein, the source node is able to compute an alternate path for a failed call that avoids the congested element within the network. Information about signaling congestion can then also be used to influence the routing of subsequent calls routed by this node such that areas experiencing signaling congesting are avoided when calls are first routed, rather than just upon crankback.

Figure 2:
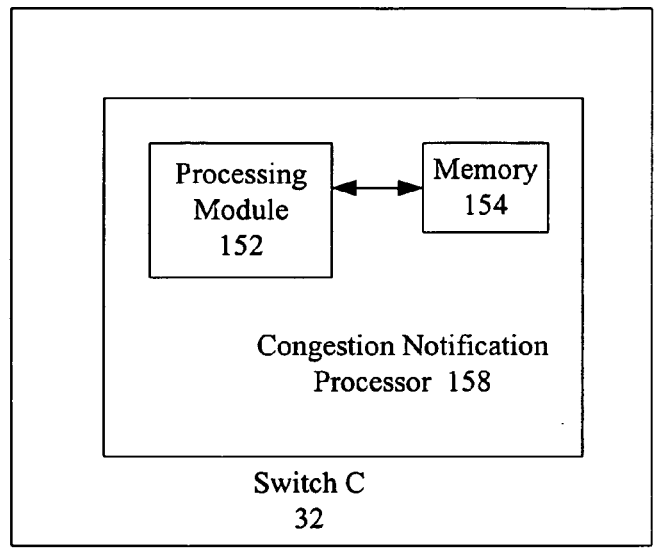
FIG. 2 illustrates a block diagram of a congestion notification processor in accordance with an embodiment of the present invention.

FIG. 2 illustrates a congestion notification processor 158 that may be included in the switch C 32 of the communication network 100 of FIG. 1. The switch C 32 is capable of detecting control plane congestion and providing a corresponding congestion notification to additional switches, or nodes, within the communication network 100. Once communicated to these additional switches, the congestion indication can be utilized to perform network functions such as sending connection set-up messages or control plane datagram messages along uncongested paths.

The congestion notification processor 158 included within the switch 150 includes a processing module 152 and memory 154. The processing module 152 may include a single processing entity or a plurality of processing entities. Such a processing entity may be a microprocessor, microcontroller, microcomputer, digital signal processor, central processing unit, state machine, group of logic circuitry, or any device that processes information based on operational or programming instructions.

The memory 154 may be a single memory device or a plurality of memory devices. Such a memory device may be a read-only memory device, random access memory device, floppy disk, hard drive memory, magnetic tape memory, DVD memory, or any device that stores digital information. Note that when the processing module 152 has one or more of its functions performed by a state machine or logic circuitry, the memory containing the corresponding operational instructions is embedded within the state machine or logic circuitry.

Figure 3:
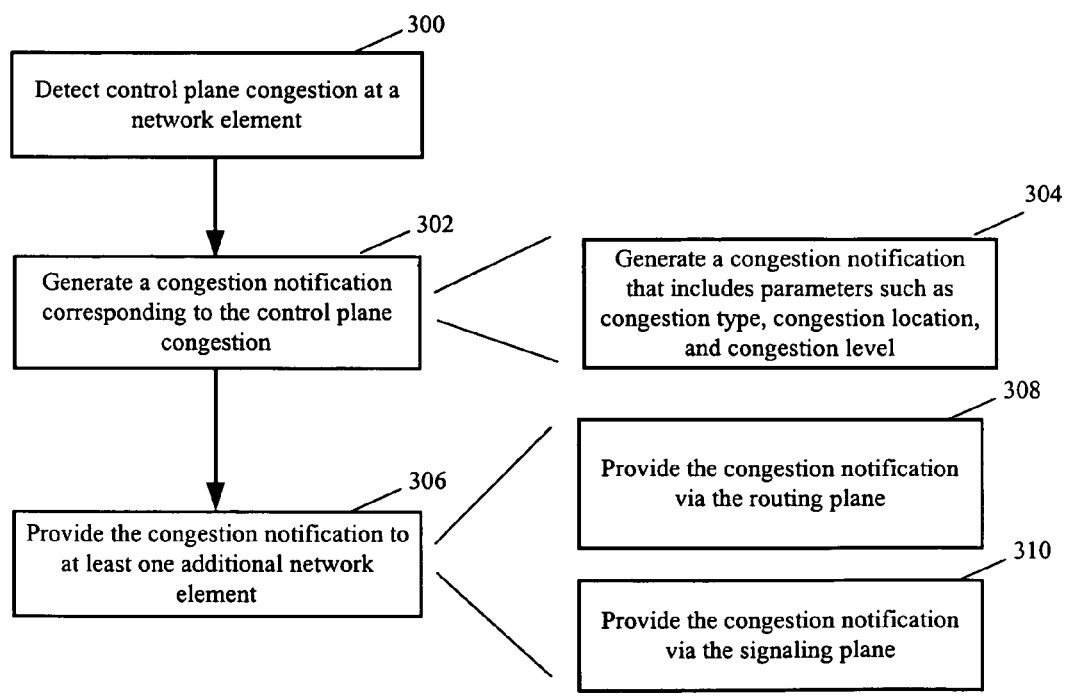
FIG. 3 illustrates a flow diagram of a method for communicating control plane congestion in accordance with an embodiment of the present invention.

The memory 154 stores programming or operating instructions that, when executed by the processing module 152, cause the processing module 152 to perform the method illustrated in FIG. 3. Note that various steps included within the method of FIG. 3 may be performed utilizing hardware separate from the processing module 152 or included within the processing module 152 that is not dependent upon operational instructions included within the memory 154. Thus, a portion of the method illustrated in FIG. 3 may be performed through the use of software, whereas other portions of the method may be executed based on a hardware implementation.

The method illustrated in FIG. 3 allows for communicating control plane congestion information in a signaling network. In some embodiments, the method may be employed in an ATM network that utilizes a PNNI routing and signaling protocol. The method begins at step 300 where control plane congestion is detected at a network element. The network element within the communication network may include a particular node (switch) within the network, or may include congestion existing on a link within the network. Detection of congestion can be accomplished by detecting excessive growth of the layer 3 to layer 2 transmission signaling link queue, congestion in programming the connection on the switch, call-processing central processing unit (CPU) congestion, etc. Essentially, congestion exists when the dynamic resources present on a node are being over utilized.

At step 302, a congestion notification corresponding to the detected control plane congestion is generated. The congestion notification generated at step 302 may be a specific congestion notification message. The congestion notification may be included in a crankback message as described above such that it is communicated via the signaling plane, or, in other embodiments, the congestion notification may be performed using the routing plane. Such a routing plane congestion message may take advantage of a resource availability information group (RAIG) that is available in PNNI networks. The RAIG includes information used to attach values of topology state parameters to nodes, links, and reachable addresses. The following tables illustrate an example RAIG data set.

The Resource Availability Information Group

| Offset | Size (Octets) | Name | Function/Description |
|---|---|---|---|
| 0 | 2 | Type | Type = 128 for outgoing resource availability information Type = 129 for incoming resource availability information |
| 2 | 2 | Length | |
| 4 | 2 | RAIG Flags | For Bit definitions see Table 5-23 RAIG Flags. |
| 6 | 2 | Reserved | |
| 8 | 4 | Administrative Weight | Default value = DefaultAdminWeight, additive |
| 12 | 4 | Maximum Cell Rate | Units: cells/second |
| 16 | 4 | Available Cell Rate | Units: cells/second |
| 20 | 4 | Cell Transfer Delay | Units: microseconds |
| 24 | 4 | Cell Delay Variation | Units: microseconds |
| 28 | 2 | Cell Loss Ratio (CLP = 0) | Encoded as the negative logarithm of the value, i.e., the value n in a message indicates a CLR of $10^{-n}$ |
| 30 | 2 | Cell Loss Ratio (CLP = 0 + 1) | Encoded as the negative logarithm of the value, i.e., the value n in a message indicates a CLR of $10^{-n}$ |
| Optional GCAC related information: | | | |
| 32 | 2 | Type | Type = 160 (optional GCAC parameters) |
| 34 | 2 | Length | |
| 36 | 4 | Cell Rate Margin | Units: cells/seconds |
| 40 | 4 | Variance Factor | Units of $2^{-8}$. Note: the value of 0xFFFFFFFF for Variance Factor is used to indicate infinity |
| Optional Signaling Congestion Indication TLV | | | |
| 44 | 2 | Type | Number identifying the congestion TLV uniquely |
| 46 | 2 | Length | |
| 48 | 2 | Congestion Level | An enumerated value indicating congestion level |

Regardless as to whether the congestion notification is provided via the signaling plane or the routing plane, the congestion notification message may include various parameters concerning the congestion as indicated at step 304. The types of congestion information (congestion parameters) that may be included in the congestion notification message include the location of the congestion, a congestion type (which may distinguish between node congestion and link congestion), and a congestion level. The congestion level may be communicated using a numerical scale, a graded scale going from slight congestion to extreme congestion, or some other type of scale that would provide useful information regarding the level of congestion. In addition, the congestion notification methods may include additional detail as to the cause of congestion such that any node receiving the congestion notification that may be able to alleviate some of the congestion will be so notified. Note that the optional congestion TLV included in the RAIG table above includes a congestion level field. The optional congestion TLV illustrated above may be part of a link TLV, address TLV or a node TLV such that it will indicate the location of the congestion at the various types of elements within the network.

Returning to FIG. 3, at step 306, the congestion notification is provided to at least one additional network element in the signaling network. Once received by the at least one additional network element, the congestion notification can be utilized for performing various network functions, including performing routing decisions not associated with an existing connection. These routing decisions not associated with an existing connection may be used for sending set-up messages used to establish new connections, sending control plane datagram messages, or sending other types of messages that utilize the control plane and would be affected by the control plane congestion.

As stated earlier, the congestion notification may be provided via the routing plane or via the signaling plane. In some cases, both the routing and the signaling planes could be used to relay congestion information. Steps 308 and 310 illustrate the different means for communicating the congestion notification. At step 308, the congestion notification is provided via the routing plane within the signaling network. When the congestion notification is provided via the routing plane, the congestion notification may be provided to one or more neighboring network elements to the network element that has detected the control plane congestion. These neighboring network elements can then propagate the congestion notification to subsequent neighboring network elements such that the congestion notification is dispersed throughout the network.

At step 310, the congestion notification is provided via the signaling plane within the signaling network. Propagation of the congestion notification within the signaling plane is preferably accomplished using crankback messages as was described earlier. The congestion information within the crankback messages may be utilized by each of the nodes along the path that the crankback message traverses such that numerous nodes are notified of the congestion by a single crankback message.

Figure 4:
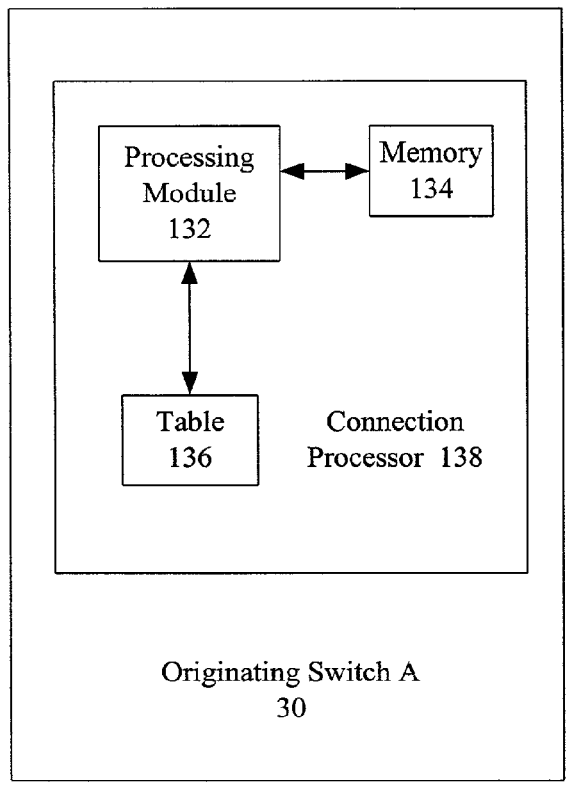
FIG. 4 illustrates a block diagram of a connection processor in accordance with an embodiment of the present invention.

As stated earlier, once the congestion notification message has been generated, it is relayed to additional network elements for use. FIG. 4 illustrates the originating switch A 30 of FIG. 1, which is shown to include a connection processor 138. The connection processor 138 enables the originating switch A 30, or any other switch within the network, to receive and interpret congestion indication messages and apply them such that network efficiency is increased. The connection processor 138 includes a processing module 132 and memory 134. As before, the processing module 132 may include a variety of different processing entities, and the memory 134 may be one or more of a variety of different memory devices. A non-exhaustive list of potential processing entities and memory structures was identified with respect to the processing module 152 and the memory 154 described with respect to FIG. 2, above.

Figure 5:
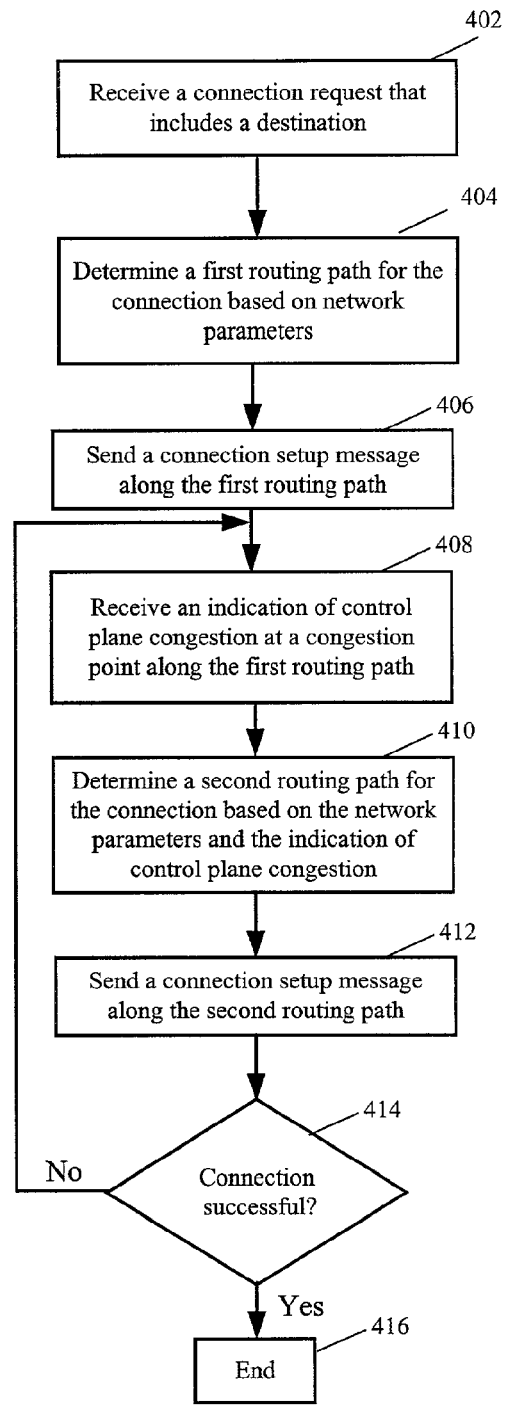
FIG. 5 illustrates a flow diagram of a method for establishing a connection in a communications network in accordance with an embodiment of the present invention.

The memory 134 stores programming or operating instructions that allow the processing module 132 to perform at least a portion of the method illustrated in FIG. 5. As before, portions of the method of FIG. 5 may be executed through the use of software, whereas other portions of the method may be executed using various hardware configurations.

FIG. 5 illustrates a method for establishing a connection in a communication network such that congested network elements (nodes or links) are avoided in subsequent connection setup attempts. As is apparent to those of ordinary skill in the art, the same principles applied to connection setup messages in FIGS. 4 and 5 with respect to congestion avoidance could be used with respect to other messages that traverse the control plane that require path selection, such as control plane datagram messages. The method begins at step 402, where a connection request that includes a destination is received. At step 404, a first routing path is determined for the connection based on network parameters, where the network parameters include topology information describing the communication network. The topology information preferably includes the interconnections (links) between the various switches (nodes) within the network. Step 404 may be performed through the use of the table 136 illustrated in FIG. 4. The table 136 may store topology information for the network such that the connection processor 138 can determine an appropriate routing path for the connection. The parameters stored in the table 136 may include various bandwidth capabilities across links within the network, different costs associated with data transmission across those links, etc. The table 136 may also store information regarding levels of signaling congestion at points in the network.

Once the first routing path for the connection has been determined at step 404, the method proceeds to step 406 where a first connection set-up message is sent along the first routing path. As described earlier, the connection set-up message is sent using the control plane within the communications network, where the control plane is distinguishable from the data plane upon which the bulk of the data information in the network is carried. Assuming that signaling congestion exists within a network element along the first routing path, at step 408 an indication of control plane congestion at a congestion point along the first routing path is received. The indication of control plane congestion may be received via the routing plane within the communications network or via the signaling plane within the communications network. The congestion indication received at step 408 may include parameters such as the location of the congestion, a type of congestion, and a level of congestion.

The receipt of the congestion indication at step 408 may include receiving a crankback message relating to the original connection set-up message issued at step 406. This corresponds to receiving the congestion indication via the signaling plane. The crankback message received is structured to include a special cause code indicating that the congestion exists and where, within the network, that congestion exists.

At step 410, a second routing path for the connection is determined using the network parameters and information included in the indication of control plane congestion. Thus, the congestion information provided in the indication of control plane congestion is utilized in conjunction with the knowledge of the network topology to determine an alternate routing path that avoids the congested element. At step 412, a subsequent connection setup message is sent along the second routing path.

At step 414, it is determined if the connection attempt was successful. If not, the method returns to step 408, where another congestion indication may be received and a new routing path can be determined. If the connection is successful, the method proceeds to the ending step 416.

When the network parameters are stored in the table 136, the congestion information included in the indication of control plane congestion may be stored with the network parameters in the table for use in determining subsequent routing paths either for connections that experience congestion or for new connections. Therefore, the routing path determinations that occurred at steps 404 and 410 may take into account congestion information regarding other congested network elements that have been stored within the table. In other systems, a separate database for congested network elements may be maintained within the switch such that the database may be consulted in determining routing paths. As such, the congestion information received in each indication of control plane congestion would be appended to the database for future use.

When the congestion information included with congestion indications is either stored in a separate database or the table storing additional network parameters, a time-out condition may be included such that the congestion information corresponding to a particular congested element is discarded after a certain period of time. This would typically be useful if the congestion indication has been relayed using the signaling plane. If the congestion notification is received via the routing plane, the routing plane would also provide an indication as to when the congestion has cleared, and there would be no reason to use a time-out condition to assume a situation for which notification will be provided. In other systems, the congestion information may be removed after a predetermined number of connection set-up messages have been sent from the source node storing the congestion information. In yet other systems that use the signaling plane to provide congestion notification, the totality or a portion of the congestion information stored within a switch may be purged when an alternate routing path that avoids a congested element within the network cannot be determined.

Note that the detection of congestion at a specific node or link may not cause that congested network element to be avoided altogether. In some embodiments, an indication of congestion may only be used to scale back the amount of control traffic sent to or through specific network elements. The portions that are sent to the somewhat congested node could be determined based on priority of the control traffic. By scaling back the amount of control traffic sent to a congested network element, congestion can be dealt with in a proactive manner that may allow serious congestion conditions to be avoided by detecting increasing congestion levels at a network element and scaling back the control traffic to that network before the problem escalates. As the congestion level at the network element is reduced, the level of traffic to the element can then be increased accordingly.

In a system that maintains congestion information for a predetermined time period, the length of time for which a particular set of congestion information is maintained in a database or table may be based on the level of congestion indicated for a particular network element. Thus, those network elements that exhibit the highest level of congestion will be maintained in the congestion database for the longest amount of time, thus allowing such network elements to hopefully alleviate their congested conditions. Similarly, those network elements that exhibit low levels of congestion may only be stored in the congestion database or table for a limited amount of time, thus reflecting the likelihood that the congested condition will have been eliminated during this limited time period. Methods other than aging based on congestion level may also be used to remove congestion information from routing tables or topology databases. In addition to utilizing the received congestion information for performing network functions such as routing a connection set-up message, the entity that receives the indication of congestion may also propagate the indication of congestion to additional elements within the network. As such, those additional elements will be able to utilize the congestion information to improve their routing decisions with respect to control plane traffic.

In the case where congestion information includes a level of congestion, high priority traffic may be prioritized such that future attempts to route connections through the congested element are first performed corresponding to the high priority connections. Alternately, connections having a lower priority may be attempted through the previously congested network element first, as if the congestion persists, the resulting delays and low level of service will not likely have a profound effect on the low priority connection.

As is apparent to those of ordinary skill in the art, the mechanisms described above can be utilized within a hierarchical network by nodes other than the originating node when performing path selection. For example, in PNNI, such mechanisms can be used by Peer Group Entry Border Nodes when performing path selection for a call entering their Peer Group.

Although the illustrations and discussion thus far have specifically discussed ATM-based communication systems, the teachings described herein are also applicable to other signaling protocols that do not currently make use of congestion signaling. For example, in Multi-Protocol Label Switching (MPLS) systems, some extremely coarse congestion information is available at the internet protocol (IP) layer via the Internet Control Messaging Protocol (ICMP). However, the coarse congestion information available at this layer is not adequate for congestion avoidance when establishing a Label Switched Path (LSP) since IP congestion indicates data plane congestion, not control plane congestion that could be due to link congestion, but could also be due to congestion on connection processors. As such, additional congestion signaling would be beneficial in an MPLS system at the label distribution protocol layer.

By utilizing the teachings provided herein, a mechanism for avoiding congestion in source routing protocol networks is available. Such congestion avoidance not only enables original connection set-ups to succeed more frequently, but also permits subsequent connection attempts to have a much higher rate of success, thus improving overall control plane network utilization. The avoidance of congestion also increases the percentage of set-up attempts that succeed under heavy load or burst conditions. In ATM systems, this can translate into very high success rates for switched virtual connections (SVCs), and soft permanent virtual connection (SPVCs). As such, high service availability for on-demand SVC services and high service uptime for SPVCs is provided.

In addition to the benefits listed above, the problems associated with large connection set-up latency due to congestion are greatly reduced as connections are initially routed around known congestion points. This is beneficial as, in prior art systems, even when connections were successfully established, the routing included congested network elements. As a result, large connection setup delays may have been experienced by such connections as the routing utilized these congested network elements. Additional benefit is derived from the fact that congestion indications may be propagated to various additional elements within the network that may also utilize the congestion information contained therein to update routing tables such that congested points are avoided. When transit nodes along a connection set-up path are enabled to tap into a congestion indication message that is being sent to a source node, this propagation is achieved without any additional signaling resources being utilized.

It should be understood that the implementation of variations and modifications of the invention and its various aspects will be apparent to those of ordinary skill in the art, and that the invention is not limited to the specific embodiments described. It is therefore contemplated to cover by the present invention, any and all modifications, variations or equivalents that fall within the spirit and scope of the basic underlying principles disclosed and claimed herein.

What is claimed is:

1. A method for communicating control plane congestion information in a signaling network, comprising:
   detecting control plane congestion at a network element, wherein said control plane congestion is not data plane congestion, wherein said control plane congestion occurs in a control plane, said control plane carrying a connection setup message, and said data plane congestion occurs in a data plane, said data plane carrying data packets for connections within the signaling network;
   generating a congestion notification corresponding to the control plane congestion;
   providing the congestion notification to at least one additional network element in the signaling network, wherein the at least one additional network element utilizes the congestion notification for routing control traffic around the network element at which the control plane congestion has been detected.

2. The method of claim 1, wherein providing the congestion notification further comprises providing the congestion notification via a routing plane within the signaling network.

3. The method of claim 2, wherein providing the congestion notification via the routing plane further comprises providing the congestion notification to neighboring network elements proximal to the network element, wherein the neighboring network elements propagate the congestion notification to subsequent neighboring network elements.

4. The method of claim 1, wherein providing the congestion notification to at least one additional network element further comprises providing the congestion notification via a signaling plane within the signaling network.

5. The method of claim 1, wherein providing the congestion notification further comprises providing the congestion notification in response to a received connection setup message generated by a source node in the network, wherein the at least one additional node includes the source node.

6. The method of claim 5, wherein providing the congestion notification further comprises providing the congestion notification via a signaling plane within the signaling network, wherein the congestion notification is provided such that the at least one additional network element includes each network element along a path traversed by the connection setup message.

7. The method of claim 1, wherein the congestion indication includes at least one congestion parameter from the set of congestion parameters that includes: a congestion type that distinguishes between node congestion and link congestion, a congestion location, and a congestion level.

8. The method of claim 1, wherein the signaling network is included in at least one of a packet-based communication network and a cell-based communication network.

9. The method of claim 8, wherein the signaling network is a source routed control network, wherein the congestion notification is included in a release message that includes a crankback information element, wherein the crankback information element includes a code indicating the congestion.

10. The method of claim 9, wherein the signaling network is included in an ATM network utilizing a Private Node Network Interface (PNNI) routing and signaling protocol.

11. A method for establishing a connection in a communication network, comprising:
receiving a request to establish the connection, wherein the request includes a destination;
determining a first routing path for the connection based on network parameters; wherein the network parameters include communication network topology information and control plane congestion information corresponding to at least one previously received congestion indication, wherein said control plane congestion information pertains to control plane congestion, wherein control plane congestion is not data plane congestion, wherein said control plane congestion occurs in a control plane, said control plane carrying a first connection setup message, and said data plane congestion occurs in a data plane, said data plane carrying data packets for connections within the communication network; and
sending the first connection setup message along the first routing path.

12. The method of claim 11 further comprises:
receiving an indication of control plane congestion, wherein the control plane congestion exists at a congestion point along the first routing path;
determining a second routing path for the connection using the network parameters and the indication of control plane congestion; and
sending a second connection setup message along the second routing path.

13. The method of claim 12, wherein the network parameters are stored in a table, and wherein receiving the indication of control plane congestion further comprises adding congestion information included in the indication of control plane congestion to the network parameters stored in the table.

14. The method of claim 13 further comprises removing the congestion information from the table after a predetermined time period.

15. The method of claim 14, wherein the congestion information includes a level of congestion, and wherein the predetermined time period is based on the level of congestion.

16. The method of claim 12 further comprises relaying the indication of control plane congestion to at least one additional node in the communication network.

17. The method of claim 12 further comprises storing congestion information included in the indication of control plane congestion in a congestion database.

18. The method of claim 12, wherein receiving the indication of control plane congestion further comprises receiving the indication of control plane congestion via a routing plane.

19. The method of claim 12, wherein receiving the indication of control plane congestion further comprises receiving the indication of control plane congestion via a signaling plane.

20. A congestion notification processor, comprising:
a processing module;
memory operably coupled to the processing module, wherein the memory stores operating instructions that, when executed by the processing module, cause the processing module to perform functions including:
detecting control plane congestion at a network element in a signaling network, wherein said control plane congestion is not data plane congestion, wherein said control plane congestion occurs in a control plane, said control plane carrying a connection setup message, and said data plane congestion occurs in a data plane, said data plane carrying data packets;
generating a congestion notification corresponding to the control plane congestion;
providing the congestion notification to at least one additional network element in the signaling network, wherein the at least one additional network element utilizes the congestion notification for routing control traffic around the network element at which the control plane congestion has been detected.

21. The congestion notification processor of claim 20, wherein the memory stores operating instructions that, when executed, cause the processing module to provide the congestion notification via a routing plane within the signaling network.

22. The congestion notification processor of claim 21, wherein the memory stores operating instructions that, when executed, cause the processing module to provide the congestion notification via the routing plane such that the congestion notification is provided to neighboring network elements proximal to the network element.

23. The congestion notification processor of claim 22, wherein utilization of the congestion notification by the at least one additional network element further comprises at least one of: updating routing tables, generating a congestion database, propagating the congestion notification to additional elements in the network, and compiling statistics reflecting network performance.

24. The congestion notification processor of claim 22, wherein the congestion notification includes a congestion level and wherein utilization of the congestion notification further comprises reducing control traffic to the network element at which the control plane congestion has been detected, wherein an amount of reduction in control traffic to the network element is based on the congestion level.

25. The congestion notification processor of claim 20, wherein the memory stores operating instructions that, when executed, cause the processing module to provide the congestion notification via a signaling plane within the signaling network.

26. The congestion notification processor of claim 20, wherein the memory stores operating instructions that, when executed, cause the processing module to provide the congestion notification in response to a received connection setup message generated by a source node in the network, wherein the at least one additional node includes the source node.

27. The congestion notification processor of claim 26, wherein the memory stores operating instructions that, when executed, cause the processing module to provide the congestion notification via a signaling plane within the signaling network; wherein the congestion notification is provided to each network element along a path traversed by the connection setup message.

28. The congestion notification processor of claim 20, wherein the congestion indication includes at least one congestion parameter from the set of congestion parameters that includes: a congestion type that distinguishes between node congestion and link congestion, a congestion location, and a congestion level.

29. The congestion notification processor of claim 20, wherein the signaling network is included in at least one of a packet-based communication network and a cell-based communication network.

30. The congestion notification processor of claim 29, wherein the signaling network is a source routed control network.

31. The congestion notification processor of claim 30, wherein the signaling network is included in an ATM network utilizing a Private Node Network Interface (PNNI) routing and signaling protocol.

32. A connection processor, comprising:
a processing module;
memory operably coupled to the processing module, wherein the memory stores operating instructions that, when executed by the processing module, cause the processing module to perform functions including:
receiving a request to establish a connection in a communication network, wherein the request includes a destination;
determining a first routing path for the connection based on network parameters, wherein the network parameters include communication network topology information and congestion information corresponding to at least one previously received congestion indication, wherein said congestion information pertains to control plane congestion, wherein said control plane congestion is not data plane congestion, wherein said control plane congestion occurs in a control plane, said control plane carrying a first connection setup message, and said data plane congestion occurs in a data plane, said data plane carrying data packets for connections within the communication network; and
sending the first connection setup message along the first routing path.

33. The connection processor of claim 32, wherein the memory stores additional instructions that, when executed by the processing module, cause the processing module to perform the additional functions of:
receiving an indication of control plane congestion at a congestion point along the first routing path;
determining a second routing path for the connection using the network parameters and the indication of control plane congestion; and
sending a second connection setup message along the second routing path.

34. The connection processor of claim 33, wherein the processing module stores the network parameters in a table, and wherein memory stores operating instructions that, when executed, cause the processing module to add congestion information included in the indication of control plane congestion to the network parameters stored in the table.

35. The connection processor of claim 34, wherein the memory stores operating instructions that, when executed, cause the processing module to remove the congestion information from the table after a predetermined time period.

36. The connection processor of claim 35, wherein the congestion information includes a level of congestion, and wherein the predetermined time period is based on the level of congestion.

37. The connection processor of claim 33, wherein the memory stores operating instructions that, when executed, cause the processing module to perform an additional function of relaying the indication of control plane congestion to at least one additional node in the communication network.

38. The connection processor of claim 33, wherein the memory stores operating instructions that, when executed, cause the processing module to store congestion information included in the indication of control plane congestion in a congestion database.

39. The connection processor of claim 33, wherein the indication of control plane congestion is received by the processing module via a routing plane.

40. The connection processor of claim 33, wherein the indication of control plane congestion is received by the processing module via a signaling plane.

41. A method for communicating control plane congestion information in a signaling network, comprising:
detecting control plane congestion at a network element, wherein said control plane congestion is not data plane congestion, wherein said control plane congestion occurs in a control plane, said control plane carrying a connection setup message, and said data plane congestion occurs in a data plane, said data plane tarrying data packets for connections within the signaling network;
generating a congestion notification corresponding to the control plane congestion, wherein the congestion notification includes a congestion level;
providing the congestion notification to at least one additional network element in the signaling network, wherein the at least one additional network element utilizes the congestion notification for reducing control traffic to the network element at which the control plane congestion has been detected such that a scaled back amount of control traffic is sent to the network element at which the control plane congestion has been detected, wherein an amount of reduction in control traffic to the network element is based on the congestion level.

42. A method for communicating control plane congestion information in a signaling network, comprising:
detecting control plane congestion at a network element, wherein said control plane congestion is not data plane congestion; wherein said control plane congestion occurs in a control plane, said control plane carrying a connection setup message, and said data plane congestion occurs in a data plane, said data plane carrying data packets for connections within the signaling network;
generating a congestion notification corresponding to the control plane congestion;
providing the congestion notification to at least one additional network element in the signaling network, wherein the at least one additional network element utilizes the congestion notification for performing at least one of: updating routing tables, generating a congestion database, propagating the congestion notification to additional elements in the network; and compiling statistics reflecting network performance.

43. A method for communicating control plane congestion information in a signaling network, comprising:
detecting control plane congestion at a network element, wherein said control plane congestion is not data plane congestion, wherein said control plane congestion occurs in a control plane, said control plane carrying a connection setup message, and said data plane congestion occurs in a data plane, said data plane carrying data packets for connections within the signaling network;
generating a congestion notification corresponding to the control plane congestion;
providing the congestion notification to at least one additional network element in the signaling network, wherein the at least one additional network element utilizes the congestion notification for scaling back of traffic sent to the network element at which the control plane congestion has been detected.

44. The method of claim 43, wherein the providing the congestion notification to the at least one additional network element further comprises:
providing the congestion notification to a source node in response to a received connection setup message generated by the source node.

45. The method of claim 43, wherein the providing the congestion notification to the at least one additional network element further comprises:
providing the congestion notification to a source node and to the at least one additional network element in the signaling network in response to a received connection setup message generated by the source node, wherein the at least one additional network element utilizes the congestion notification for reducing control traffic to the network element at which the control plane congestion has been detected.

46. The method of claim 45, wherein the congestion notification is provided such that the at least one additional network element comprises a network element along a path traversed by the connection setup message.

47. The method of claim 43, wherein the congestion notification is provided such that the congestion notification comprises a congestion level, wherein the scaling back of traffic is based on the congestion level.

48. The method of claim 43 further comprising:
maintaining the congestion information for a predetermined time period; and
removing the congestion information after the predetermined time period.

49. The method of claim 43 further comprising:
prioritizing traffic such that traffic of a priority is attempted to be routed through the network element at which the control plane congestion has been detected after the congestion notification has been provided.

50. The method of claim 49, wherein the prioritizing traffic further comprises:
prioritizing traffic such that traffic of a high priority is attempted to be routed through the network element at which the control plane congestion has been detected after the congestion notification has been provided.

51. The method of claim 49, wherein the prioritizing traffic further comprises:
prioritizing traffic such that traffic of a lower priority is attempted to be routed through the network element at which the control plane congestion has been detected after the congestion notification has been provided.

52. A congestion notification processor, comprising:
a processing module;
memory operably coupled to the processing module, wherein the memory stores operating instructions that, when executed by the processing module, cause the processing module to perform functions including:
detecting control plane congestion at a network element in a signaling network, wherein said control plane congestion is not data plane congestion, wherein said control plane congestion occurs in a control plane, said control plane carrying a connection setup message, and said data plane congestion occurs in a data plane, said data plane carrying data packets for connections within the signaling network;
generating a congestion notification corresponding to the control plane congestion;
providing the congestion notification to at least one additional network element in the signaling network, wherein the at least one additional network element utilizes the congestion notification for scaling back of traffic sent to the network element at which the control plane congestion has been detected.

53. The congestion notification processor of claim 52, wherein the at least one additional network element is a source node, wherein the providing the congestion notification occurs in response to a received connection setup message generated by the source node.

54. The congestion notification processor of claim 52, wherein the congestion notification is provided to a source node and to the at least one additional network element in the signaling network in response to a received connection setup message generated by the source node, wherein the at least one additional network element utilizes the congestion notification for reducing control traffic to the network element at which the control plane congestion has been detected.

55. The congestion notification processor of claim 54, wherein the at least one additional network element comprises a network element along a path traversed by the connection setup message.

56. The congestion notification processor of claim 52, wherein the congestion notification comprises a congestion level, wherein the scaling back of traffic is based on the congestion level.

57. The congestion notification processor of claim 52, wherein the operating instructions further cause the processing module to perform:
maintaining the congestion information for a predetermined time period; and
removing the congestion information after the predetermined time period.

58. The congestion notification processor of claim 57, wherein the operating instructions further cause the processing module to perform the maintaining of the congestion information in a routing table.

59. The congestion notification processor of claim 57, wherein the operating instructions further cause the processing module to perform the maintaining of the congestion information in a topology database.

60. The congestion notification processor of claim 52, wherein the operating instructions further cause the processing module to perform:
prioritizing traffic such that traffic of a priority is attempted to be routed through the network element at which the control plane congestion has been detected after the congestion notification has been provided.

61. The congestion notification processor of claim 60, wherein the traffic of a priority further comprises traffic of a high priority.

62. The congestion notification processor of claim 60, wherein the traffic of a priority further comprises traffic of a lower priority.

* * * * *